US010402132B2

(12) United States Patent
Akiyama

(10) Patent No.: US 10,402,132 B2
(45) Date of Patent: *Sep. 3, 2019

(54) MANAGEMENT SYSTEM, MANAGEMENT APPARATUS, AND MANAGEMENT METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yuuichi Akiyama, Numazu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,497

(22) Filed: Nov. 19, 2018

(65) Prior Publication Data

US 2019/0095153 A1 Mar. 28, 2019

Related U.S. Application Data

(63) Continuation of application No. 15/713,825, filed on Sep. 25, 2017, now Pat. No. 10,162,585.

(51) Int. Cl.
*G06F 3/12* (2006.01)
*G06T 11/60* (2006.01)

(52) U.S. Cl.
CPC .......... *G06F 3/1242* (2013.01); *G06F 3/1208* (2013.01); *G06T 11/60* (2013.01)

(58) Field of Classification Search
CPC ....... G06F 3/1242; G06F 3/1208; G06T 11/60
(Continued)

(56) References Cited

U.S. PATENT DOCUMENTS 8,830,511 B2 9/2014 Tanaka et al.
2013/0016375 A1* 1/2013 Hashidume ........... G06F 3/1222
358/1.9
(Continued)

FOREIGN PATENT DOCUMENTS

JP 2010-100044 5/2010
JP 2016-57608 4/2016

OTHER PUBLICATIONS

Non-Final Office Action for U.S. Appl. No. 15/713,825 dated Mar. 30, 2018.
U.S. Appl. No. 15/713,825, filed Sep. 25, 2017.

*Primary Examiner* — Neil R McLean
(74) *Attorney, Agent, or Firm* — Amin, Turocy & Watson LLP

(57) ABSTRACT

In accordance with an embodiment, a management system comprises a first information generation section, a second information generation section, a storage section and a determination section. The first information generation section generates first information indicating that a processing of forming an image on a sheet is executed at the time information instructing formation of the image is input. The second information generation section generates second information indicating that a processing of decolorizing the image formed on the sheet is executed at the time information instructing a processing of decolorizing the image is input. The storage section stores the first information and the second information. The determination section determines whether or not the processing of decolorizing the image formed on the sheet is executed on the sheet by a predetermined time point preset in the management system based on the first information and the second information.

16 Claims, 16 Drawing Sheets

(58) Field of Classification Search
USPC ........................................................ 358/1.15
See application file for complete search history.

(56) References Cited

U.S. PATENT DOCUMENTS

| | | | |
|---|---|---|---|
| 2013/0016376 A1 | 1/2013 | Hashidume et al. | |
| 2014/0199103 A1* | 7/2014 | Terada .................. | G03G 21/00 399/341 |
| 2015/0227105 A1* | 8/2015 | Miyoshi ................ | G03G 15/70 399/21 |
| 2016/0364635 A1* | 12/2016 | Namura ............... | G06K 15/027 |

* cited by examiner

| MANAGEMENT NUMBER | CONFIDENTIAL IMAGE NAME | SCHEDULED NUMBER OF PRINTED SHEETS | COLLECTION COMPLETION SCHEDULED TIME LIMIT | OPERATOR | NUMBER OF TIMES OF DECOLORING PROCESSING |
|---|---|---|---|---|---|
| 1011 | Secret1 | 5 | December 31, 2017 | ATA | 3 |
| 1012 | Secret2 | 10 | January 10, 2018 | BKO | 6 |
| 1013 | Secret3 | 2 | April 01, 2018 | CTARO | 0 |
| ... | ... | ... | ... | ... | ... |

FIG.12

MANAGEMENT SYSTEM, MANAGEMENT APPARATUS, AND MANAGEMENT METHOD

CROSS-REFERENCE TO RELATED APPLICATIONS

This application is a Continuation of application Ser. No. 15/713,825 filed on Sep. 25, 2017, the entire contents of which are incorporated herein by reference.

FIELD

Embodiments described herein relate generally to a management system, a management apparatus, and a management method.

BACKGROUND

There is known an image forming apparatus capable of forming an image with a decoloring toner. A user uses a decoloring apparatus to decolorize an image formed on a sheet as it becomes unnecessary after confidential information is printed on the sheet with the decoloring toner. The user collects all the sheets on which the confidential information is printed to reduce the possibility of unwanted disclosure of the confidential information. However, as the sheet is managed manually, there is a case in which all the sheets on which the confidential information is printed cannot be reliably collected.

BRIEF DESCRIPTION OF THE DRAWINGS

FIG. 12 is a diagram illustrating a concrete example of management information associated with an identification number according to the embodiment;

DETAILED DESCRIPTION

In accordance with an embodiment, a management system comprises a first information generation section, a second information generation section, a storage section and a determination section. The first information generation section generates first information indicating that a processing of forming an image on a sheet is executed. The second information generation section generates second information indicating that a processing of decolorizing the image formed on the sheet is executed. The storage section stores the first information and the second information. The determination section determines whether or not the processing of decolorizing the image formed on the sheet is executed by a predetermined time point based on the first information and the second information.

Hereinafter, an image processing apparatus according to an embodiment is described with reference to the accompanying drawings.

Figure 1:
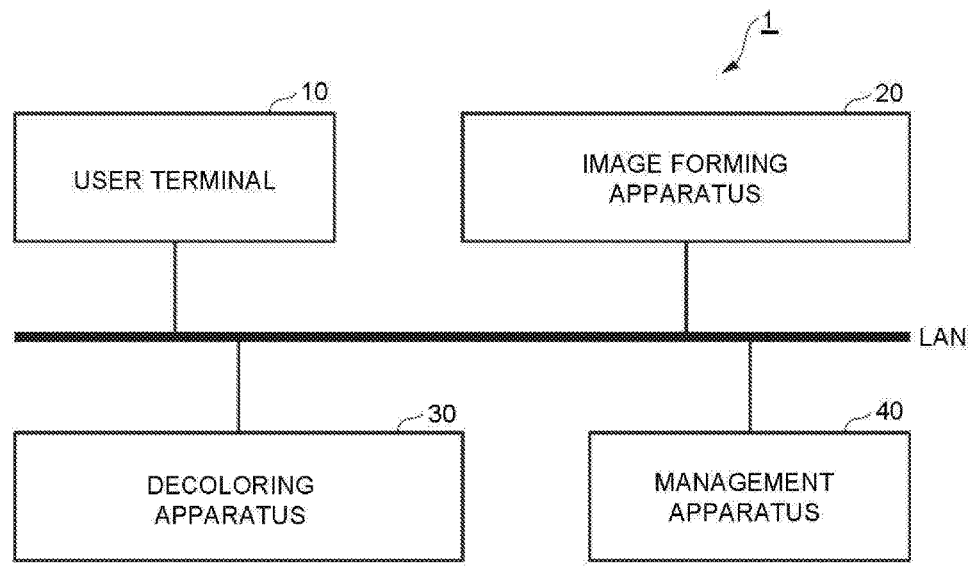
FIG. 1 is a diagram illustrating a concrete example of a management system according to an embodiment.

FIG. 1 is a diagram illustrating a concrete example of a management system 1 according to the embodiment. The management system 1 in FIG. 1 is used for managing confidential information. More specifically, the management system 1 is used for forming a confidential image on a sheet and managing the sheet. The confidential image indicates the confidential information. The management system 1 forms the confidential image on the sheet with a decoloring toner. Next, the management system 1 acquires the result of a decoloring processing on the confidential image formed on the sheet. The management system 1 further determines whether or not the sheet is collected by the management system 1 within a predetermined time limit. In this way, the management system 1 forms the confidential image on the sheet and manages the sheet.

The "decoloring" in the present embodiment means making an image formed by a color (including not only chromatic colors but also achromatic colors such as white and black) different from a color of a base of the sheet visually invisible. The decoloring toner is decolorized at a decoloring temperature. Hereinafter, a temperature at which the toner is fixed on the sheet is referred to as a fixing temperature, and a temperature at which the toner is decolorized is referred to as a decoloring temperature. The decoloring temperature is generally higher than the fixing temperature. The "decoloring processing" in the present embodiment means that the temperature of the sheet on which an image is formed with the decoloring toner is equal to or higher than the decoloring temperature of the decoloring toner. The sheet is an object on which an image is formed by the image forming apparatus, and may be, for example, an envelope, a paper having an IC chip, an OHP sheet, a specially processed sheet (laminated sheet paper, water resistant paper), or the like. Hereinafter, "image information" in the present embodiment means information indicating an image.

The management system 1 includes a user terminal 10, an image forming apparatus 20, a decoloring apparatus 30 and a management apparatus 40. The user terminal 10, the image forming apparatus 20, the decoloring apparatus 30 and the management apparatus 40 are connected to one another via an LAN (Local Area Network).

The user terminal 10 is used by a user to operate the management system 1. The user terminal 10 is, for example, a personal computer. The user terminal 10 acquires information (hereinafter referred to as "start instruction information") instructing the management system 1 to form the confidential image through an input by the user.

The user terminal 10 acquires image information (hereinafter referred to as "confidential image information") of the confidential image formed on the sheet by the management system 1 through the input by the user. The user terminal 10 acquires information (hereinafter referred to as "basic management information") for the management system 1 to manage the sheet on which the confidential image is formed through the input by the user. The basic management information includes designated number of sheets information and collection time limit information. The designated number of sheets information indicates the number of sheets on which the confidential image is formed. The collection time limit information indicates due date (hereinafter referred to as "collection due date") at which the sheet must be collected by the management system 1. The basic management information may further include information such as confidential image name information and executor name information. The confidential image name information indicates a name attached to the confidential image. The executor name information indicates a name of a person who inputs the start instruction information. Hereinafter, the start instruction information, the confidential image information, and the basic management information are referred to as start association information.

If the start association information is acquired, the user terminal 10 transmits request information. The request information instructs the management apparatus 40 to manage the sheet. The user terminal 10 sending the request information acquires an identification number that the management apparatus 40 gives for each confidential image. The identification number identifies the start association information. The identification number is assigned to the start association information each time the management system 1 acquires the start association information.

The user terminal 10 generates the image information (hereinafter referred to as "formation image information") of a formation image formed by the image forming apparatus 20 with the decoloring toner. The formation image includes the confidential image. The formation image is an image in which a confidential mark, a management mark and the confidential image are superimposed. The confidential mark is formed on the sheet to indicate that the confidential image is formed. The management mark indicates the identification number and the basic management information as images.

The user terminal 10 sends the formation image information, the identification number and the designated number of sheets information to the image forming apparatus 20 and instructs the image forming apparatus 20 to form the formation image.

The image forming apparatus 20 forms the formation image indicated by the formation image information acquired from the user terminal 10 on the sheet with the decoloring toner. The image forming apparatus 20 forms the formation image on the sheet corresponding to the number indicated by the designated number of sheets information acquired from the user terminal 10.

The decoloring apparatus 30 decolorizes the sheet on which the formation image is formed and collects the decolorized sheet. The decoloring apparatus 30 detects the confidential mark formed on the sheet by the image forming apparatus 20 before decolorizing the sheet on which the formation image is formed with the decoloring toner. The decoloring apparatus 30 transmits information (hereinafter referred to as "confidential mark detection completion information") indicating that the confidential mark is detected to the management apparatus 40. The decoloring apparatus 30 detects the management mark before the decoloring processing is executed on the sheet on which the formation image is formed with the decoloring toner. Furthermore, the decoloring apparatus 30 acquires the identification number. The decoloring apparatus 30 sends the acquired identification number to the management apparatus 40.

The management apparatus 40 executes an accomplishment determination. The accomplishment determination is to determine whether or not all of the sheets on which the confidential image is formed are collected by the management system 1 by the time limit indicated by the collection time limit information. The management apparatus 40 acquires the confidential mark detection completion information and the identification number transmitted by the decoloring apparatus 30. The management apparatus 40 acquires the basic management information transmitted by the user terminal 10. The management apparatus 40 executes the accomplishment determination based on the acquired confidential mark detection completion information, the identification number and the basic management information. The management apparatus 40 transmits information indicating the determination result (hereinafter referred to as "time limit exceeding determination result information") to the user terminal 10.

Figure 2:
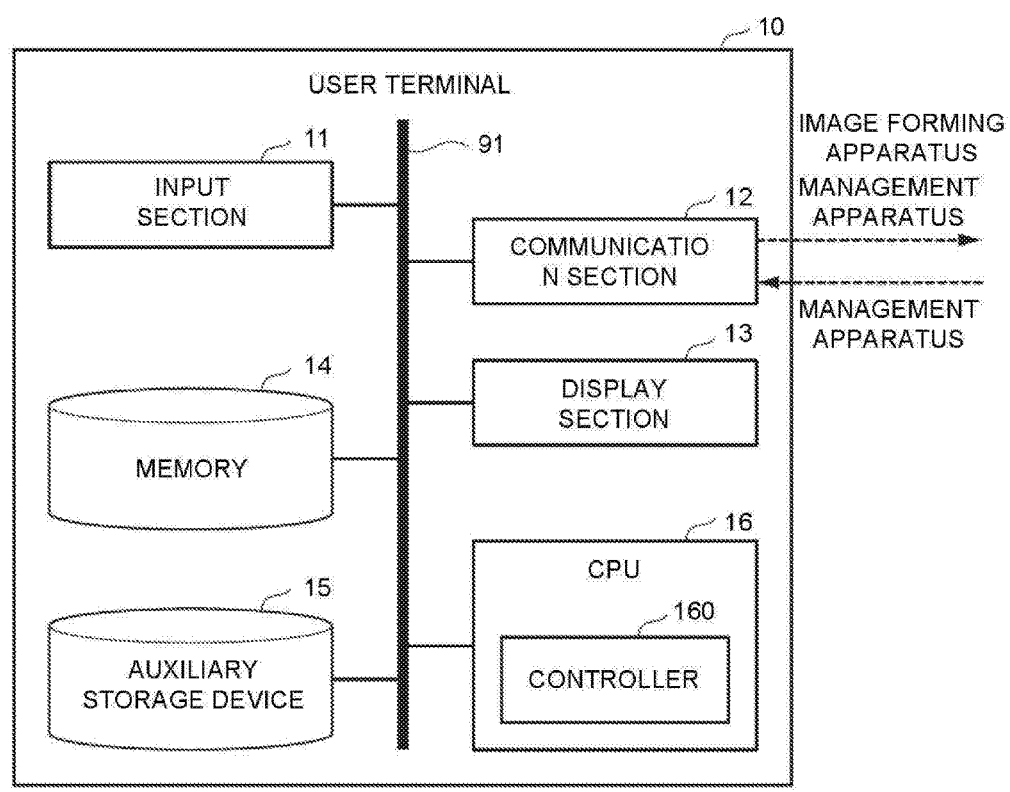
FIG. 2 is a diagram illustrating a concrete example of the hardware structure of a user terminal according to the embodiment.

FIG. 2 is a diagram illustrating a concrete example of the hardware structure of the user terminal 10 according to the embodiment. The user terminal 10 includes a CPU (Central Processing Unit) 16, a memory 14 and an auxiliary storage device 15 connected via a bus line 91 to execute a program. The user terminal 10 functions as a device including an input section 11, a communication section 12, a display section 13 and a controller 160 by execution of the program. All or a part of the functions of the user terminal 10 may be realized by using hardware such as ASIC (Application Specific Integrated Circuit), PLD (Programmable Logic Device), and FPGA (Field Programmable Gate Array). The program may be recorded on a computer-readable recording medium. The computer-readable recording medium is, for example, a portable medium such as a flexible disk, a magneto-optical disk, a ROM, a CD-ROM or the like, or a storage device such as a hard disk built in a computer system. The program may be transmitted via an electric communication line.

The input section 11 includes input devices such as a mouse, a keyboard, a touch panel, and the like. The input section 11 may be an interface connecting these input devices to the user terminal 10. The input section 11 receives the input of the start instruction information, the confidential image information and the basic management information for the user terminal 10.

Figure 3:
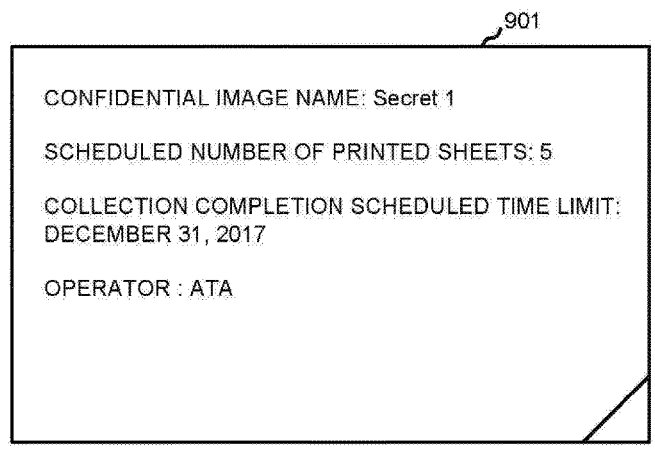
FIG. 3 is a diagram illustrating a concrete example of basic management information according to the embodiment.

FIG. 3 is a diagram illustrating a concrete example of the basic management information according to the embodiment. The basic management information is stored in the memory 14 or the auxiliary storage device 15 as a text file 901 shown in FIG. 3, for example. In the example in FIG. 3, the basic management information includes the confidential image name information, the designated number of sheets information, the collection time limit information, and the executor name information. In the example in FIG. 3, the confidential image name information is indicated by a character string at the right side of a colon in the line of the confidential image name, which indicates that the confidential image name is Secret 1. The number of sheets indicated by the designated number of sheets information is indicated by a number at the right side of the colon in the line of a scheduled number of printed sheets, which indicates that the number of sheets is five. The collection time limit information is indicated by the date at the right side of the colon in the line of a scheduled collection completion date, which indicates that the collection due date is Dec. 31, 2017. The executor name information is indicated by a character string at the right side of the colon in line of an operator, which indicates that the person who inputs the start instruction information in the input section 11 is ATa.

Returning to the description of FIG. 2, the communication section 12 includes a communication interface for connecting to the image forming apparatus 20 and the management apparatus 40.

The display section 13 includes a display device such as a CRT (Cathode Ray Tube) display, a liquid crystal display, or an organic EL (Electro-Luminescence) display. The display section 13 may be an interface connecting these display devices to the user terminal 10. The display section 13 displays information input by the user to the user terminal 10, information transmitted by the management apparatus 40 to the user terminal 10, and the like.

Figure 4:
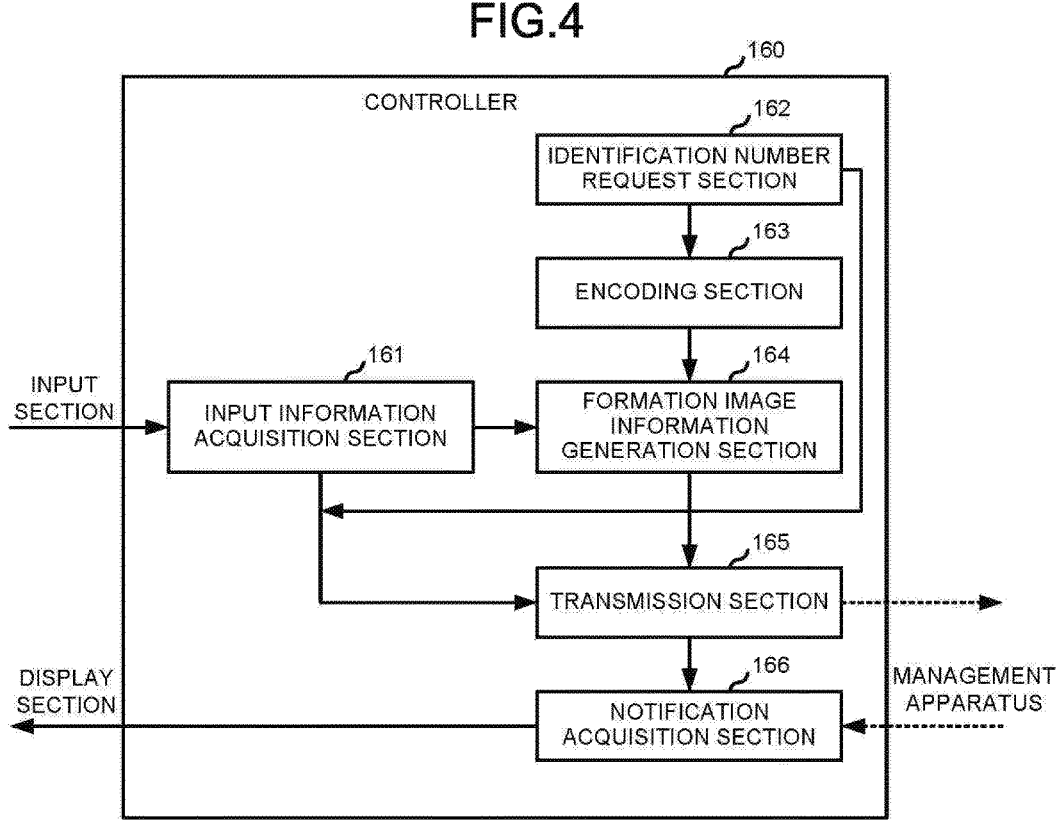
FIG. 4 is a diagram illustrating a concrete example of the functional components of a controller included in the user terminal according to the embodiment.

FIG. 4 is a diagram illustrating a concrete example of the functional components of the controller 160 included in the user terminal 10 according to the embodiment. The controller 160 includes an input information acquisition section 161, an identification number request section 162, an encoding section 163, a formation image information generation section 164, a transmission section 165 and a notification acquisition section 166.

The input information acquisition section 161 acquires the start instruction information, the basic management information and the confidential image information input to the input section 11.

The identification number request section 162 sends request information to the management apparatus 40 via the communication section 12. In response to the request, the identification number request section 162 acquires information indicating the identification number from the management apparatus 40 via the communication section 12.

The encoding section 163 generates the management mark. For example, the encoding section 163 generates the management mark by encoding the identification number and the basic management information into a two-dimensional code or a one-dimensional code. The identification number is acquired by the input information acquisition section 161, and the basic management information is acquired by the identification number request section 162. For example, the encoding section 163 may encode the identification number and the basic management information into a QR code (registered trademark) or a barcode.

The formation image information generation section 164 acquires the confidential image information, the image information of the management mark, and the confidential mark previously stored in the auxiliary storage device 15. The confidential image information is acquired by the input information acquisition section 161. The management mark is generated by the encoding section 163. The formation image information generation section 164 generates an image combining the confidential image, the management mark and the confidential mark as the formation image to generate the formation image information thereof.

The transmission section 165 transmits the formation image information, the information indicating the identification number and the designated number of sheets information to the image forming apparatus 20 via the communication section 12. The formation image information is generated by the formation image information generation section 164. The information indicating the identification number is acquired by the identification number request section 162. The designated number of sheets information is included in the basic management information acquired by the input information acquisition section 161.

The notification acquisition section 166 acquires the time limit exceeding determination result information from the management apparatus 40 via the communication section 12. The notification acquisition section 166 transmits the acquired time limit exceeding determination result information to the display section 13.

Figure 5:
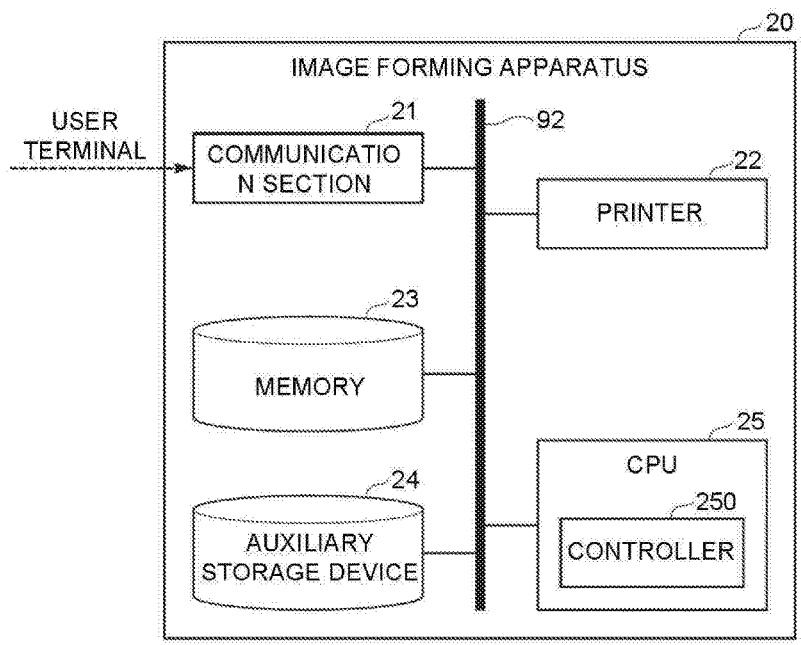
FIG. 5 is a diagram illustrating a concrete example of the hardware structure of an image forming apparatus according to the embodiment.

FIG. 5 is a diagram illustrating a concrete example of the hardware structure of the image forming apparatus 20 according to the embodiment. The image forming apparatus 20 forms on the sheet an image indicated by the formation image information acquired from the user terminal 10 with the decoloring toner. The image forming apparatus 20 includes a CPU 25, a memory 23 and an auxiliary storage device 24 connected via a bus line 92 to execute a program. The image forming apparatus 20 functions as a device including a communication section 21, a printer 22 and a controller 250 by executing the program.

The communication section 21 includes a communication interface for connecting the image forming apparatus 20 to the user terminal 10 and the decoloring apparatus 30.

The printer 22 forms an image on the sheet with the decoloring toner based on the formation image information. The formation image information is acquired from the user terminal 10 by the controller 250 via the communication section 21. The printer 22 forms an image indicated by the formation image information on the sheet by the following processing, for example. An image forming section (not shown) of the printer 22 forms an electrostatic latent image on a photoconductive drum based on the formation image information. The image forming section (not shown) of the printer 22 forms a visible image by attaching the decoloring toner to the electrostatic latent image. A transfer section (not shown) of the printer 22 transfers the visible image onto the sheet. A fixing section (not shown) of the printer 22 heats and presses the sheet to fix the visible image on the sheet.

The printer 22 discharges the sheet on which the image is formed to a sheet discharge section (not shown) of the image forming apparatus 20.

Figure 6:
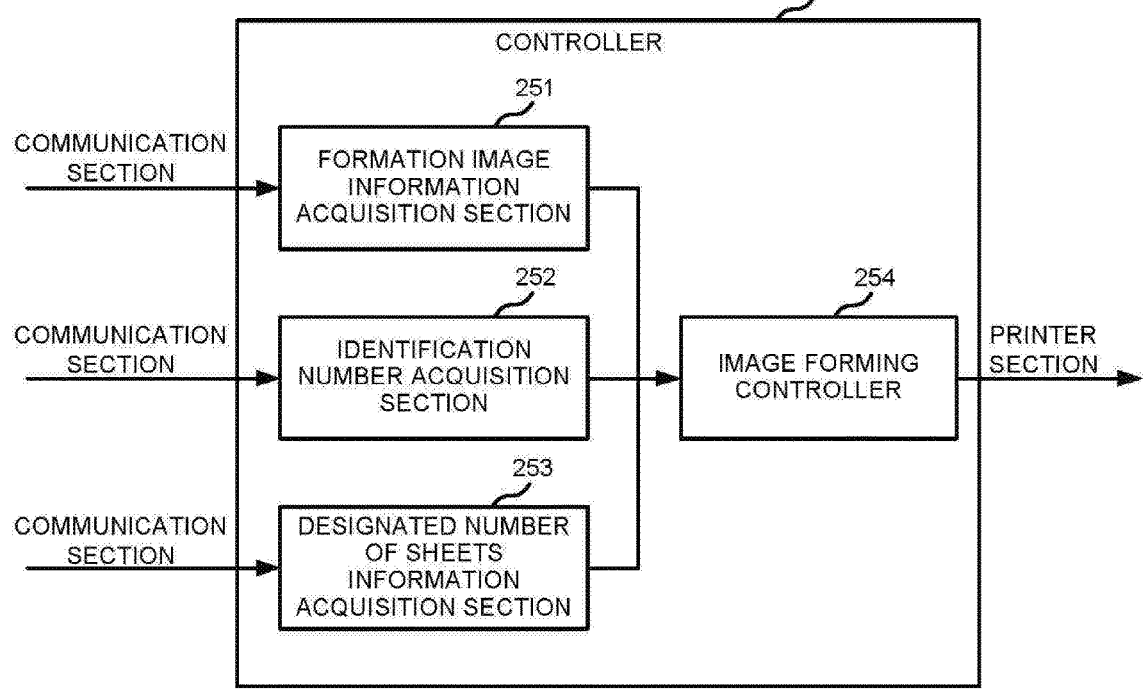
FIG. 6 is a diagram illustrating a concrete example of the functional components of a controller included in the image forming apparatus according to the embodiment.

FIG. 6 is a diagram illustrating a concrete example of the functional components of the controller 250 included in the image forming apparatus 20 according to the embodiment. The controller 250 includes a formation image information acquisition section 251, an identification number acquisition section 252, a designated number of sheets information acquisition section 253 and an image forming controller 254.

The formation image acquisition section 251 acquires the formation image information generated by the user terminal 10 via the communication section 21. The identification number acquisition section 252 acquires information indicating the identification number from the user terminal 10 and the management apparatus 40 via the communication section 21. The designated number of sheets information acquisition section 253 acquires the designated number of sheets information from the user terminal 10 via the communication section 21.

If the identification numbers of the user terminal 10 and the management apparatus 40 acquired by the identification number acquisition section 252 are the same number, the image forming controller 254 controls the printer 22 to form an image indicated by the formation image information acquired by the formation image information acquisition section 251. The image forming controller 254 controls the printer 22 to form the image indicated by the formation image information. The image forming controller 254 controls the printer 22 so as to form the image on the sheets the number of which is indicated by the designated number of sheets information acquired by the designated number of sheets information acquisition section 253.

Figure 7:
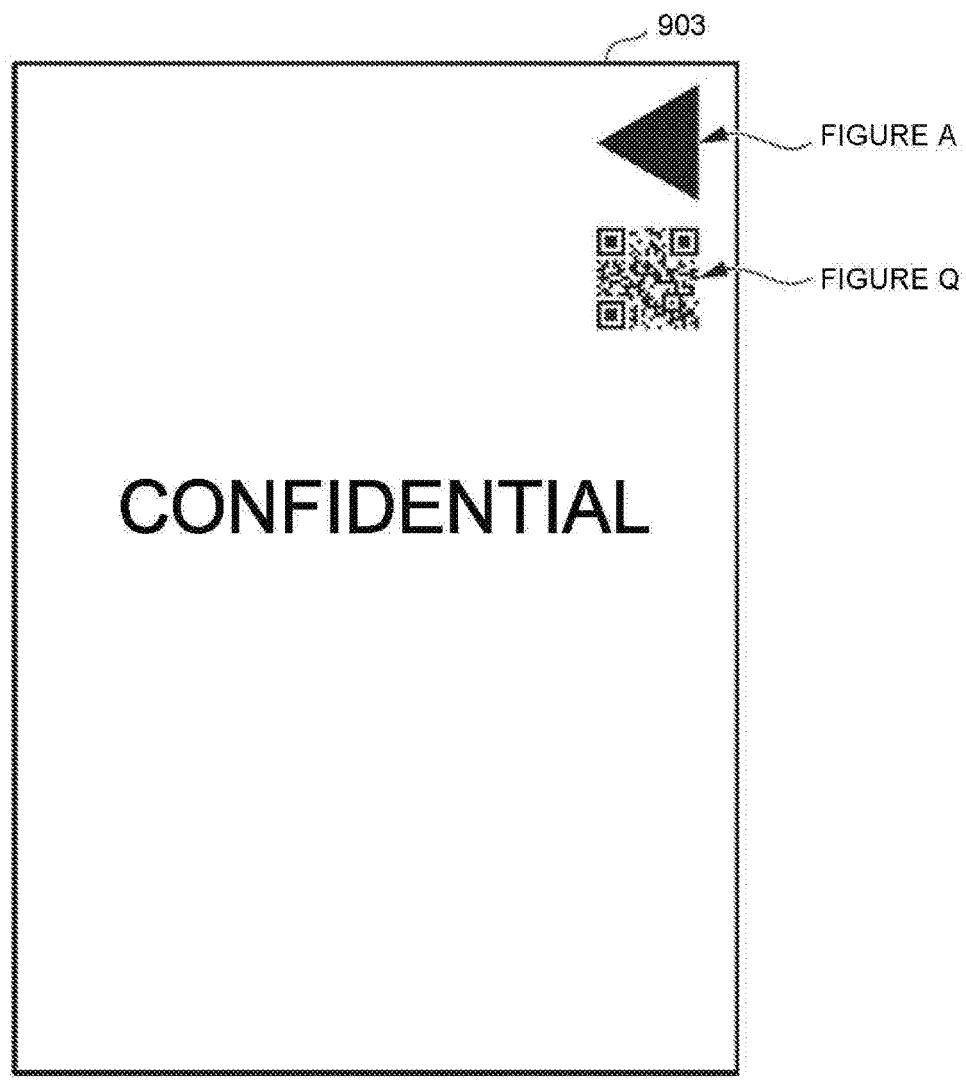
FIG. 7 is a diagram illustrating a concrete example of a sheet on which an image indicated by formation image information is formed by the image forming apparatus according to the embodiment.

FIG. 7 is a diagram illustrating a concrete example of the sheet on which an image indicated by the formation image information is formed by the image forming apparatus 20 according to the embodiment. The example in FIG. 7 is a sheet on which an image representing a character "confidential", a figure A, and a figure Q are formed. In the example in FIG. 7, the image representing the character "confidential" is the confidential image. In the example in FIG. 7, the figure A formed at the upper right of the confidential image is the confidential mark. In the example in FIG. 7, the figure Q formed under the confidential mark is the management mark.

Figure 8:
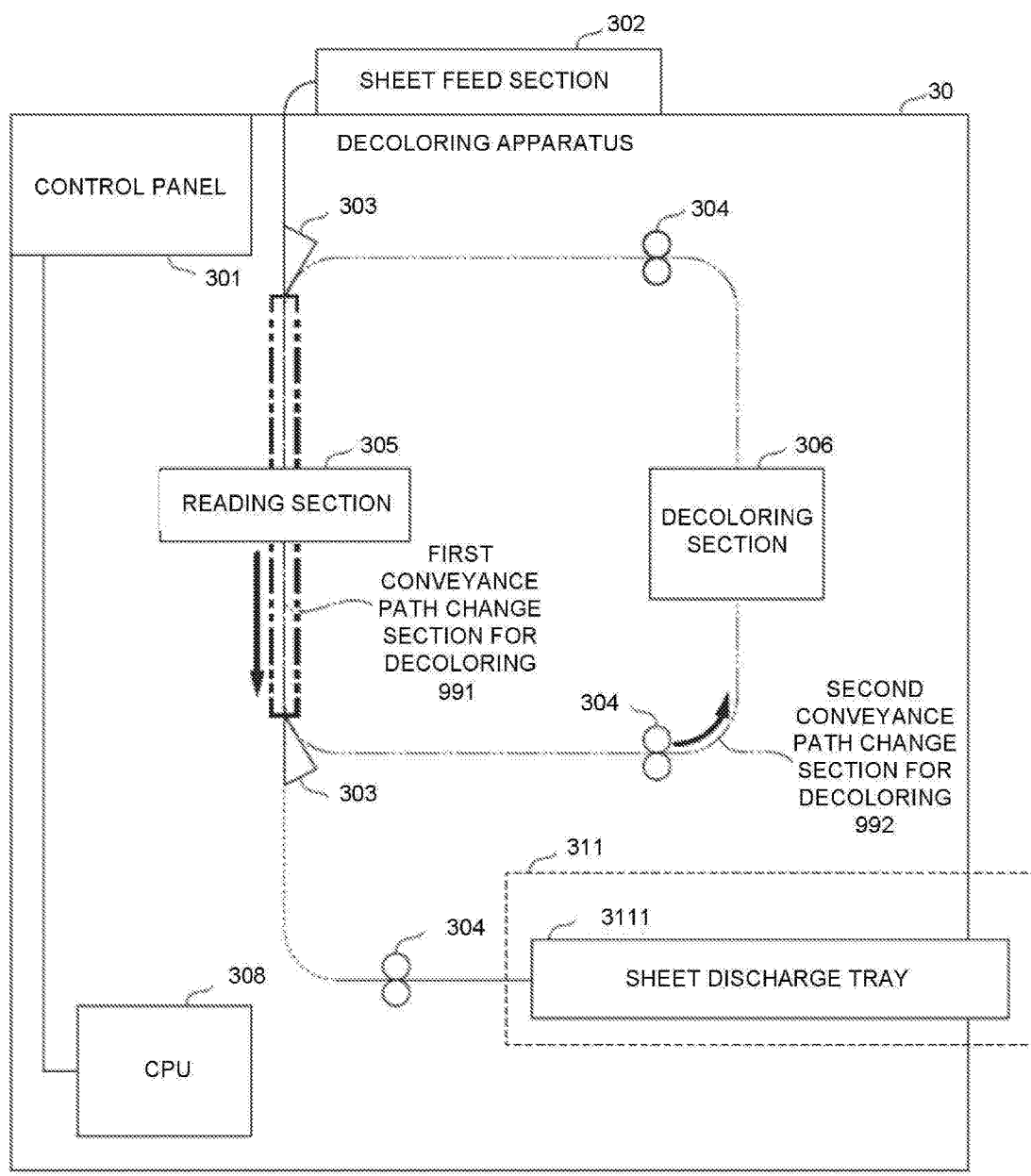
FIG. 8 is a sectional view schematically illustrating a decoloring apparatus according to the embodiment.

FIG. 8 is a sectional view schematically illustrating the decoloring apparatus 30 according to the embodiment. The decoloring apparatus 30 decolorizes the sheet on which the formation image is formed with the decoloring toner. The decoloring apparatus 30 informs the management apparatus 40 that the decoloring processing is executed on the sheet on which the formation image is formed with the decoloring toner. The decoloring apparatus 30 includes a control panel 301, a sheet feed section 302, a conveyance path change section 303, a conveyance roller 304, a reading section 305, a decoloring section 306, a sheet discharge section 311 and a CPU 308.

The control panel 301 has a plurality of buttons. The control panel 301 receives an operation by the user. The control panel 301 outputs a signal corresponding to the operation executed by the user to the CPU 311 of the decoloring apparatus 30. The control panel may be integrated with the display.

The sheet feed section 302 includes a tray for stacking the sheets. The sheet feed section 302 takes out the sheets stacked on the tray one by one and feeds it to the inside of the decoloring apparatus 30.

The conveyance path change section 303 changes the conveyance path of the sheet to change a conveyance destination of the sheet according to the processing of the decoloring apparatus 30. The conveyance path change section 303 is constituted by using mechanical components such as a plurality of rollers and motors and electronic components for electronically controlling them.

The conveyance roller 304 sandwiches the sheet with two rollers and conveys the sandwiched sheet in a predetermined direction.

The reading section 305 is constituted by using an image sensor such as a CCD (Charge Coupled Device) or a COMS (Complementary Metal Oxide Semiconductor) sensor. The reading section 305 reads the conveyed sheet and generates image information of the read sheet. Hereinafter, the image information generated by reading the sheet the reading section 305 is referred to as read image information.

The decoloring section 306 executes the decoloring processing on the conveyed sheet. The decoloring section 306 decolorizes the image on the sheet by applying the heat, for example. The decoloring section 306 includes, for example, a heater lamp, a heat roller, a pressure roller and a temperature sensor. The heater lamp heats the heat roller. The heat roller contacts a surface of the sheet on which the image is formed and conveys the sheet while applying the heat. The pressure roller is positioned at the opposite side of the heat roller across the sheet. The pressure roller conveys the sheet. The temperature sensor detects the temperature of the heat roller. The decoloring section 306 heats the sheet to a certain temperature or higher with the heat roller heated by the heater lamp to decolorize the image on the sheet.

The sheet discharge section 311 is the discharge destination of the sheet subjected to the decoloring processing. The sheet discharge section 311 includes a sheet discharge tray 3111 to stack the discharged sheets.

Figure 9:
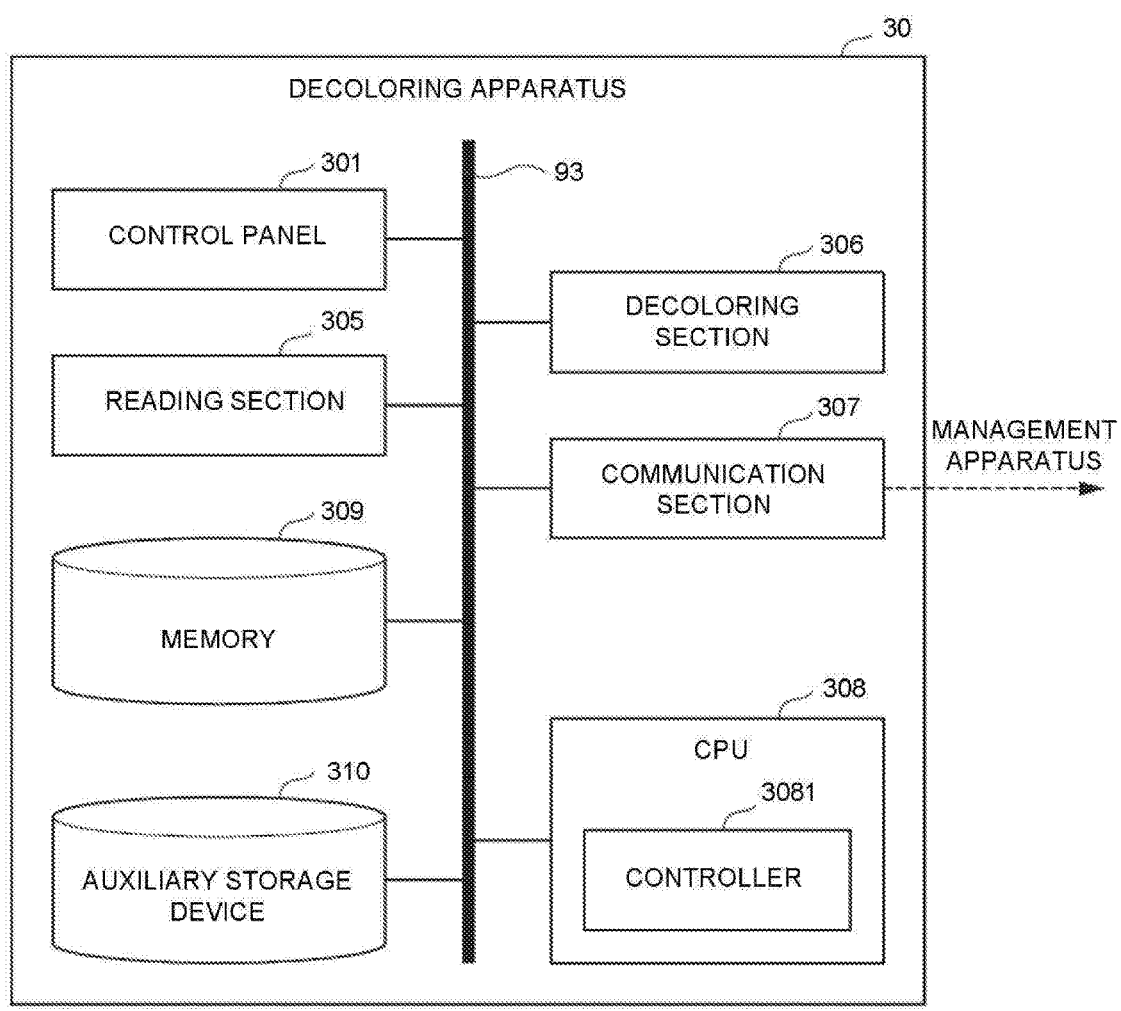
FIG. 9 is a diagram illustrating a concrete example of the hardware structure of the decoloring apparatus according to the embodiment.

FIG. 9 is a diagram illustrating a concrete example of the hardware structure of the decoloring apparatus 30 according to the embodiment. The decoloring apparatus 30 includes a CPU 308, a memory 309 and an auxiliary storage device 310 connected via a bus line 93 to execute a program. The decoloring apparatus 30 functions as a device including the control panel 301, the reading section 305, the decoloring section 306, a communication section 307 and a controller 3081 by execution of the program.

The communication section 307 includes a communication interface for connecting the decoloring apparatus 30 to the management apparatus 40.

Figure 10:
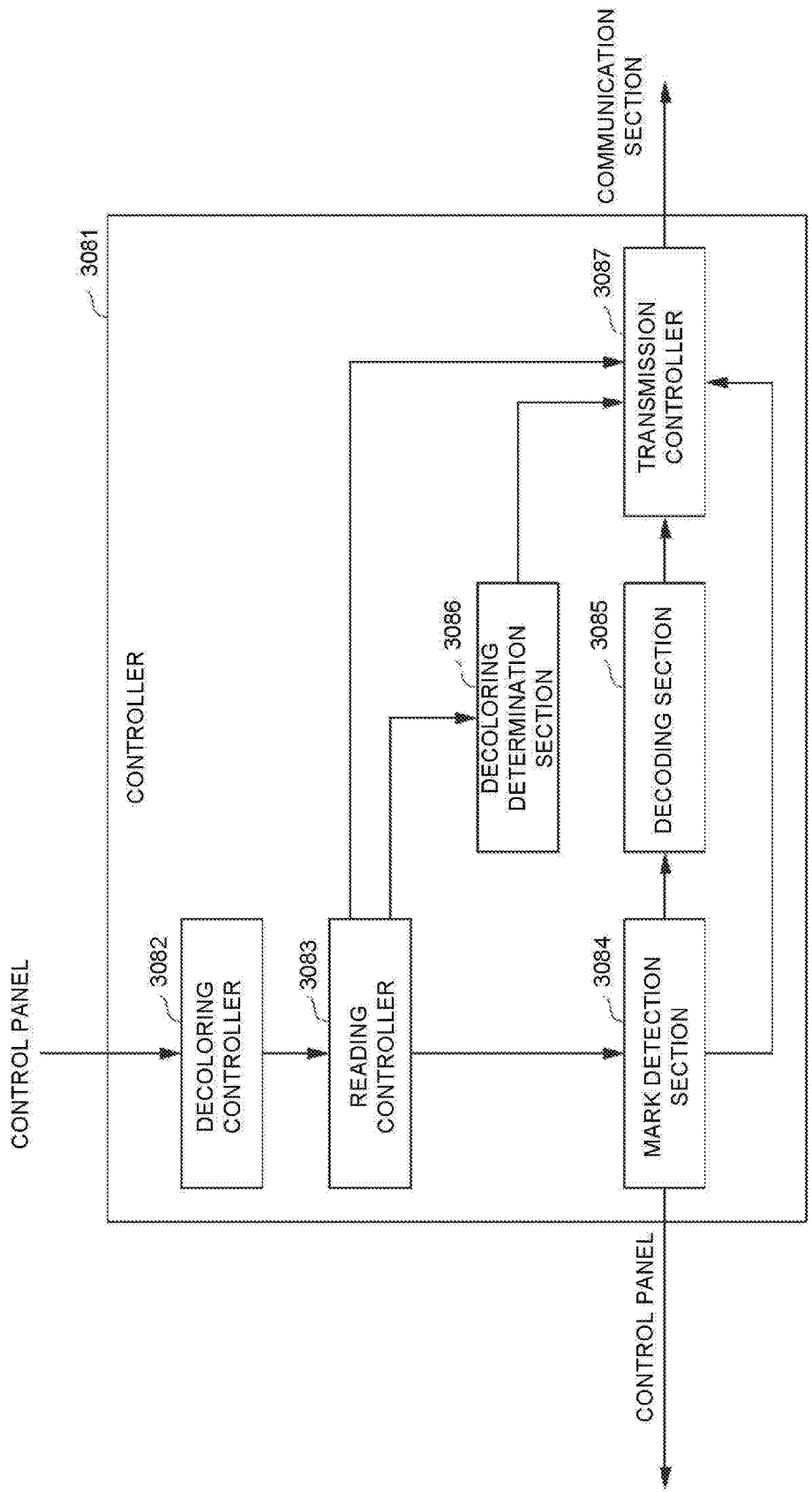
FIG. 10 is a diagram illustrating a concrete example of the functional components of a controller included in the decoloring apparatus according to the embodiment.

FIG. 10 is a diagram illustrating a concrete example of the functional components of the controller 3081 included in the decoloring apparatus 30 according to the embodiment. The controller 3081 includes a decoloring controller 3082, a reading controller 3083, a mark detection section 3084, a decoding section 3085, a decoloring determination section 3086 and a transmission controller 3087.

The decoloring controller 3082 controls each functional section of the decoloring apparatus 30 in such a manner that the decoloring section 306 executes the decoloring processing on the sheet on which the image is formed by the decoloring toner. The decoloring controller 3082 controls each functional section of the decoloring apparatus 30 in such a manner that the sheet subjected to the decoloring processing is conveyed to the sheet discharge section 311. For example, the decoloring controller 3082 controls the sheet feed section 302, the conveyance path change section 303, the conveyance roller 304 and the decoloring section 306 to execute the decoloring processing on the sheets. For example, the decoloring controller 3082 controls the conveyance path change section 303 and the conveyance roller 304 to convey the sheet to the sheet discharge section 311. Specifically, the decoloring controller 3082 controls the sheet feed section 302, the conveyance path change section 303, the conveyance roller 304 and the decoloring section 306 in such a manner that the sheet is conveyed as follows. First, the decoloring controller 3082 controls the sheet feed section 302 to feed a sheet. The decoloring controller 3082 then controls the conveyance path change section 303 and the conveyance roller 304 in such a manner that the sheet reaches the decoloring section 306 through the reading section 305. The decoloring controller 3082 executes the decoloring processing on the sheet in the decoloring section 306. The decoloring controller 3082 then controls the conveyance path change section 303 and the conveyance roller 304 in such a manner that the sheet passes through the reading section 305 again. The decoloring controller 3082 controls the conveyance path change section 303 and the conveyance roller 304 so as to convey the sheet twice passing through the reading section 305 to the sheet discharge section 311.

The reading controller 3083 controls the reading section 305. The reading controller 3083 controls the reading section 305 to read the sheet at the time the sheet arrives at a predetermined position of the reading section 305. The reading controller 3083 may determine whether or not it is detected that the sheet is positioned at a predetermined position, for example, by a sensor (not shown) or the like. The sheet fed by the sheet feed section 302 passes through the reading section 305 twice before passing through the decoloring section 306 and after passing through the decoloring section 306. Therefore, the reading controller 3083 acquires the read image information twice for one sheet. Hereinafter, the image information of the sheet read before the sheet passes through the decoloring section 306 is referred to as reading image information before decoloring. Hereinafter, the image information of the sheet read after passing through the decoloring section 306 is referred to as reading image information after decoloring. The reading controller 3083 outputs the reading image information before decoloring and the reading image information after decoloring to the mark detection section 3084, the decoloring determination section 3086 and the transmission controller 3087.

The mark detection section 3084 acquires the reading image information before decoloring generated by the reading section 305 and detects the confidential mark included in the image indicated by the reading image information before decoloring. If detecting the confidential mark, the mark detection section 3084 outputs the confidential mark detection completion information indicating that the confidential mark is detected to the transmission controller 3087. The mark detection section may display that the mark is detected on the control panel 301.

The decoding section 3085 acquires and decodes the management mark included in the read image information if the mark detection section 3084 detects the confidential mark. The decoding section 3085 acquires the identification number by decoding the management mark. The decoding section 3085 outputs the acquired identification number to the transmission controller 3087.

The decoloring determination section 3086 determines whether or not the image on the sheet is decolorized based on the reading image information after decoloring. The determination is made by a predetermined method. For example, the predetermined method may be a method of making determination depending on whether the density of the color of the image indicated by the reading image information after decoloring is darker or thinner than a preset density. The decoloring determination section 3086 outputs the determination result to the transmission controller 3087.

The transmission controller 3087 transmits the confidential mark detection completion information, the reading image information before decoloring, the reading image information after decoloring, the determination result information, and the information indicating the identification number via the communication section 307 to the management apparatus 40. The reading image information before decoloring and the reading image information after decoloring are acquired by the transmission controller 3087 from the reading controller 3083. The determination result information indicates the determination result of the decoloring determination section 3086. The information indicating the identification number is acquired by the decoding section 3085.

Figure 11:
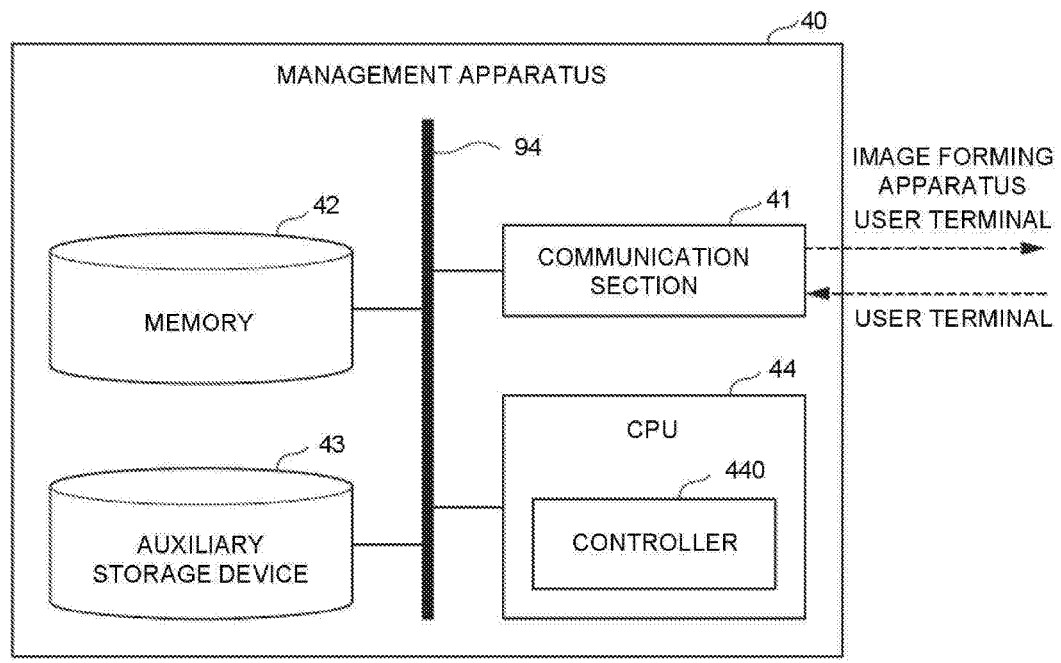
FIG. 11 is a diagram illustrating a concrete example of the hardware structure of a management apparatus according to the embodiment.

FIG. 11 is a diagram illustrating a concrete example of the hardware structure of the management apparatus 40 according to the embodiment. The management apparatus 40 determines whether or not all the sheets on which the confidential image is formed are decolorized by the decoloring apparatus 30 by the time limit indicated by the collection time limit information. The management apparatus 40 notifies the user terminal 10 of the result. The management apparatus 40 includes a CPU 44, a memory 42, an auxiliary storage device 43, and the like connected via a bus line 94 to execute a program. The management apparatus 40 functions as a device including a communication section 41 and a controller 440 by execution of the program.

The communication section 41 includes a communication interface for connecting the management apparatus 40 to the user terminal 10, the image forming apparatus 20 and the decoloring apparatus 30.

The auxiliary storage device 43 is constituted by using a storage device such as a magnetic hard disk device or a semiconductor storage device. The auxiliary storage device 43 stores the basic management information in association with the identification number. The auxiliary storage device 43 stores number of times information in association with the identification number. The number of times information indicates the number of sheets subjected to the decoloring processing with respect to the sheet managed by the identification number associated with the number of times information. The number of sheets subjected to the decoloring processing may be the number of times of processing that is necessarily executed a predetermined number of times each time the decoloring apparatus 30 executes the decoloring processing. For example, the number of sheets subjected to decoloring processing may be the number of times the decoloring apparatus 30 sends the identification number for managing the sheet to the management apparatus 40. Therefore, the number of sheets subjected to decoloring processing may be the number of times the management apparatus 40 acquires the identification number associated with the number of times information from the decoloring apparatus 30. Hereinafter, for the sake of simplicity, it is assumed that the number of times information indicates the number of times the management apparatus 40 acquires the management number associated with the number of times information from the decoloring apparatus 30. Hereinafter, the information including the basic management information and the number of times information associated with the identification number is referred to as management information.

FIG. 12 is a diagram illustrating a concrete example of the management information associated with the identification number according to the embodiment. For example, the management information is stored in the auxiliary storage device 43 as a management table 904 shown in FIG. 12. The management table 904 has a record for each management number. Each record has the values of a management number, a confidential image name, a scheduled number of printed sheets, a collection completion scheduled time limit, an operator, and the number of times of the decoloring processing. The management number indicates the identification number. The number of times of the decoloring processing indicates the number of times information. The confidential image name, the scheduled number of printed sheets, the collection completion scheduled time limit, the operator is the same as FIG. 3. For example, a record 905 indicates that the identification number is 1011. The record 905 further indicates that the name indicating the confidential image is Secret 1. The record 905 indicates that the number of sheets on which the confidential image of the name indicated by the confidential image name is formed by the image forming apparatus 20 is five. The record 905 indicates that the collection due date for the sheet on which the confidential image of the name indicated by the confidential image name is formed is Dec. 31, 2017. The record 905 indicates that the person who executes the processing identified by the identification number 1011 is ATa. The record 905 indicates that the decoloring apparatus 30 executes the decoloring processing three times on the sheet managed by the identification number 1011 until then.

Figure 13:
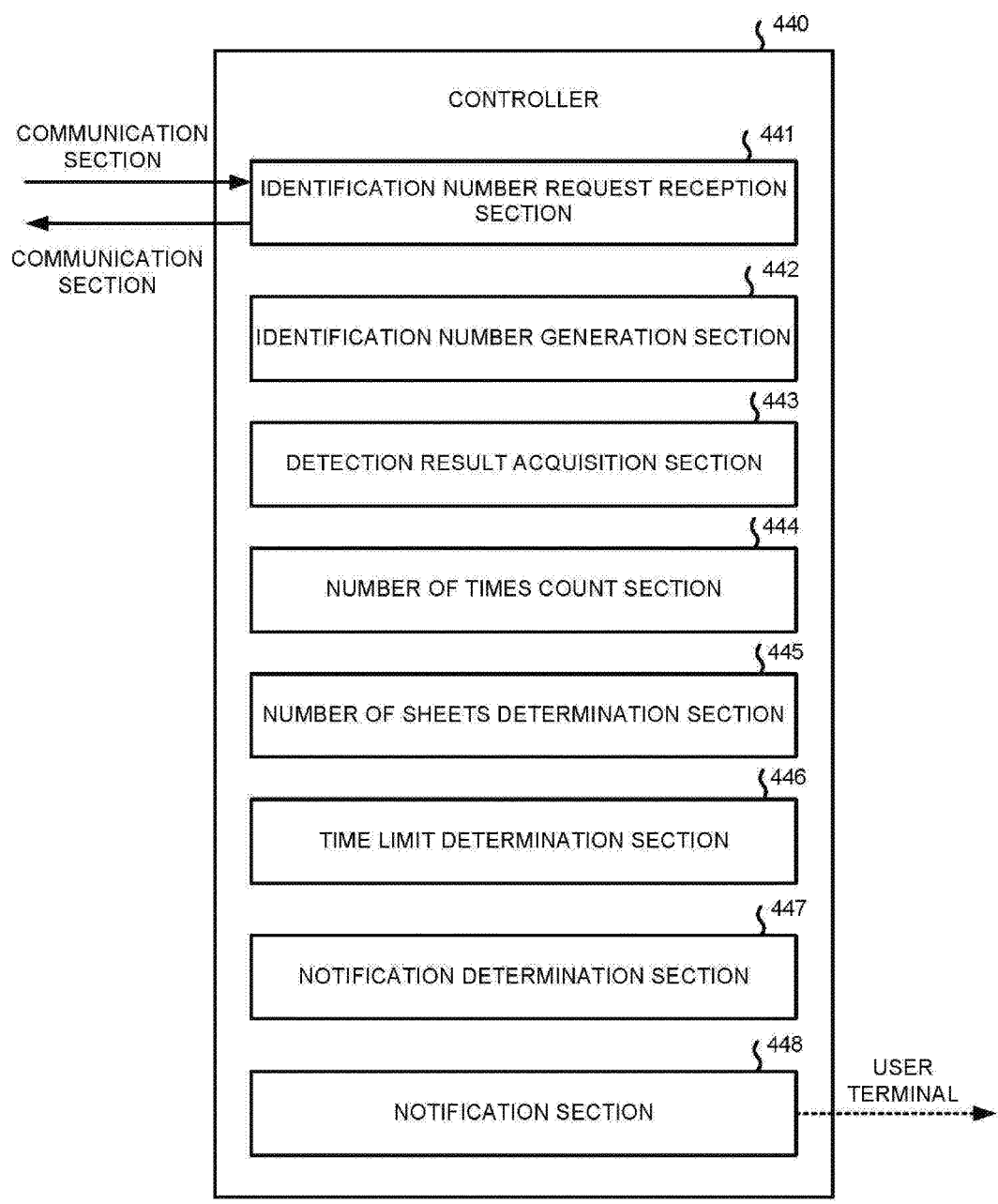
FIG. 13 is a diagram illustrating a concrete example of the functional components of a controller included in the management apparatus according to the embodiment.

FIG. 13 is a diagram illustrating a concrete example of the functional components of the controller 440 included in the management apparatus 40 according to the embodiment. The controller 440 includes an identification number request reception section 441, an identification number generation section 442, a detection result acquisition section 443, a number of times count section 444, a number of sheets determination section 445, a time limit determination section 446, a notification determination section 447 and a notification section 448.

The identification number request reception section 441 acquires the request information transmitted by the identification number request section 162 of the user terminal 10 and transmits the identification number to the identification number request section 162 of the user terminal 10.

The identification number generation section 442 generates the identification number by a predetermined method based on the management information stored in the auxiliary storage device 43. For example, the identification number generation section 442 refers to the management number in the management table 904 to acquire a number not used as the management number as the identification number. The identification number generation section 442 outputs the generated identification number to the identification number request reception section 441.

The detection result acquisition section 443 acquires the confidential mark detection completion information, the reading image information before decoloring, the reading image information after decoloring, the determination result information and the identification number which is acquired by the decoding section 3085 of the decoloring apparatus 30 from the decoloring apparatus 30 via the communication section 21.

The number of times count section 444 acquires the identification information acquired by the detection result acquisition section 443 and updates the value indicated by the number of times information stored in the auxiliary storage device 43. For example, the value indicated by the number information is updated as follows. First, the number of times count section 444 refers to the management table 904 in FIG. 12 each time the identification number is received from the decoloring apparatus 30. Next, the number of times count section 444 selects a record having the value of the identification number as an item value of the management number. The number of times count section 444 acquires the item value of the number of times of the decoloring processing from the selected record. Finally, the number of times count section 444 executes an updating processing. The updating processing is a processing in which the number of times count section 444 updates the item value of the number of times of the decoloring processing acquired by itself. Specifically, if the detection result acquisition section 443 acquires the information indicating the identification number whose value is 1011, the updating processing is executed as follows. The number of times count section 444 updates the value indicated by the number of times of the decoloring processing from 3 to 4 with reference to the record 905 of the management table 904 in FIG. 12.

The number of sheets determination section 445 determines whether or not the value indicated by the number of times information is equal to the value indicated by the designated number of sheets information. Hereinafter, for the sake of simplicity, it is assumed that the number of sheets determination section 445 determines true if the value indicated by the number of times information is equal to the value indicated by the designated number of sheets information. Further, the number of sheets determination section 445 determines false if the value indicated by the number of times information is not equal to the value indicated by the designated number of sheets information.

The time limit determination section 446 refers to the management information to determine whether or not the current time exceeds the collection due date corresponding to each identification number of the management information. The time limit determination section 446 compares the time limit indicated by the collection time limit information corresponding to each identification number of the management information with the current time. The current time is the time indicated by a clock (not shown) built in the controller 440 of the management apparatus 40. The time limit determination section 446 executes that determination at the time of acquiring the determination result of the number of sheets determination section 445 and at the predetermined time.

The notification determination section 447 determines whether or not the sheets the number of which is indicated by the designated number of sheets information are decolorized by the time limit indicated by the collection time limit information. The notification determination section 447 carries out the determination based on the determination results of the number of sheets determination section 445 and the time limit determination section 446. Specifically, by the time limit indicated by the collection time limit information, the number of sheets determination section 445 determines whether or not the value indicated by the number of times information is equal to the value indicated by the designated number of sheets information. The notification determination section 447 transmits the time limit exceeding information to the user terminal 10 via the notification section 448 if the number of sheets determination section 445 does not determine true by the time limit indicated by the collection time limit information.

The notification section 448 notifies the user terminal 10 of the time limit exceeding information in accordance with the determination result of the notification determination section 447.

Figure 14:
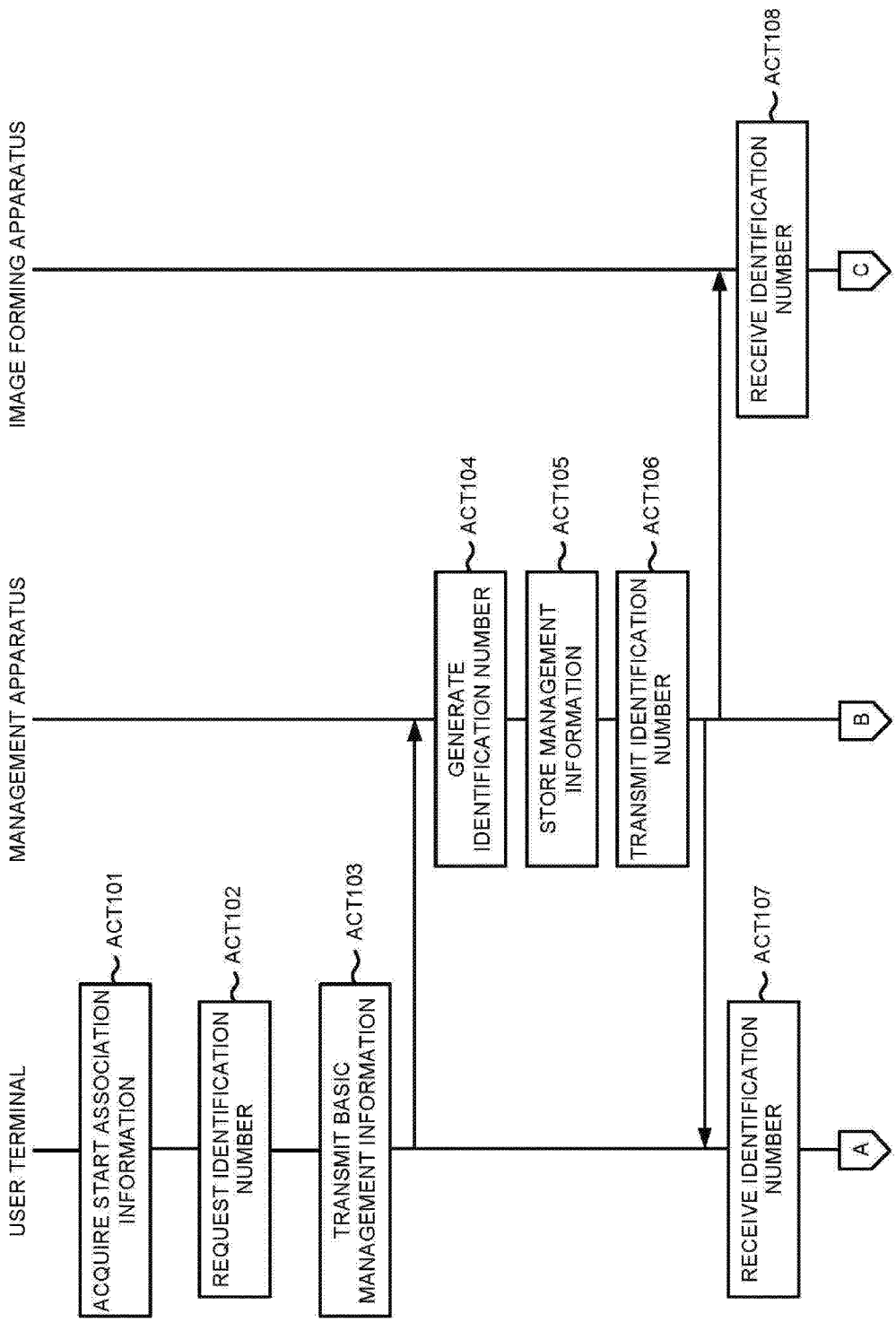
FIG. 14 is a sequence diagram illustrating the flow of a processing of forming an image indicated by the confidential information on the sheet by the management system according to the embodiment.
Figure 15:
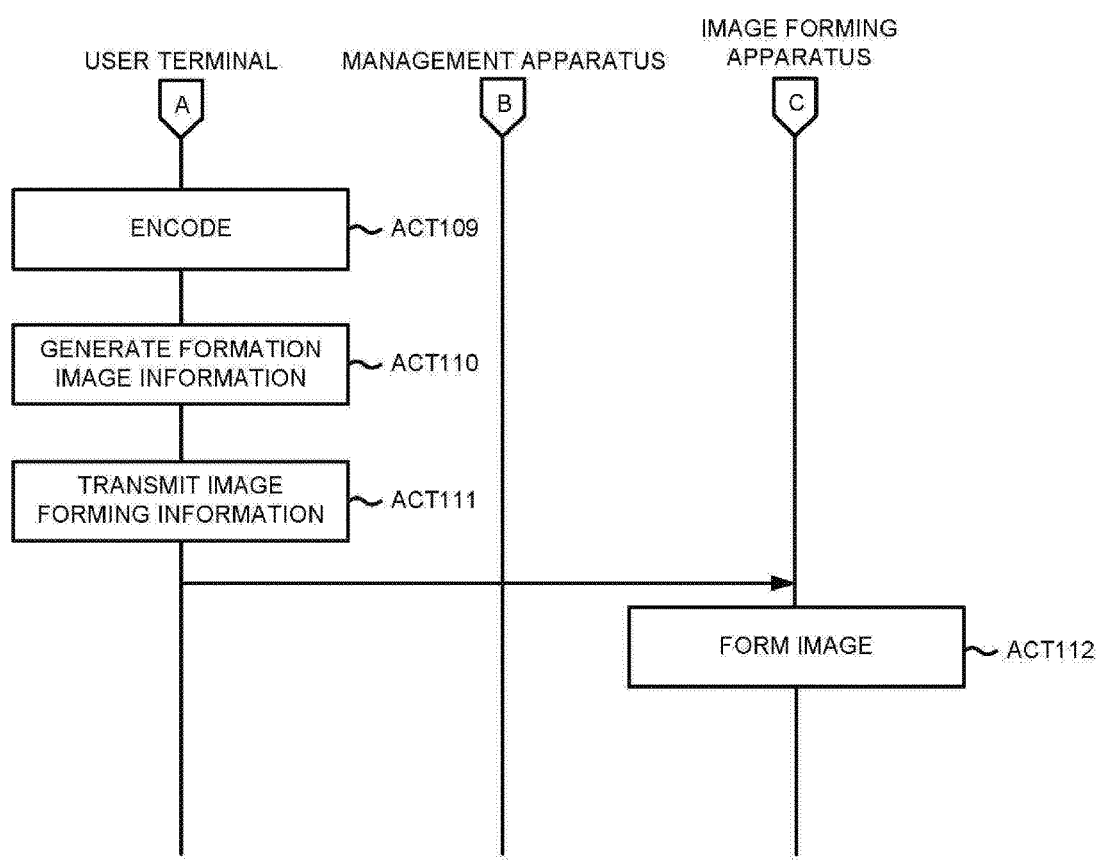
FIG. 15 is a sequence diagram illustrating the flow of the processing of forming the image indicated by the confidential information on the sheet by the management system according to the embodiment.
Figure 16:
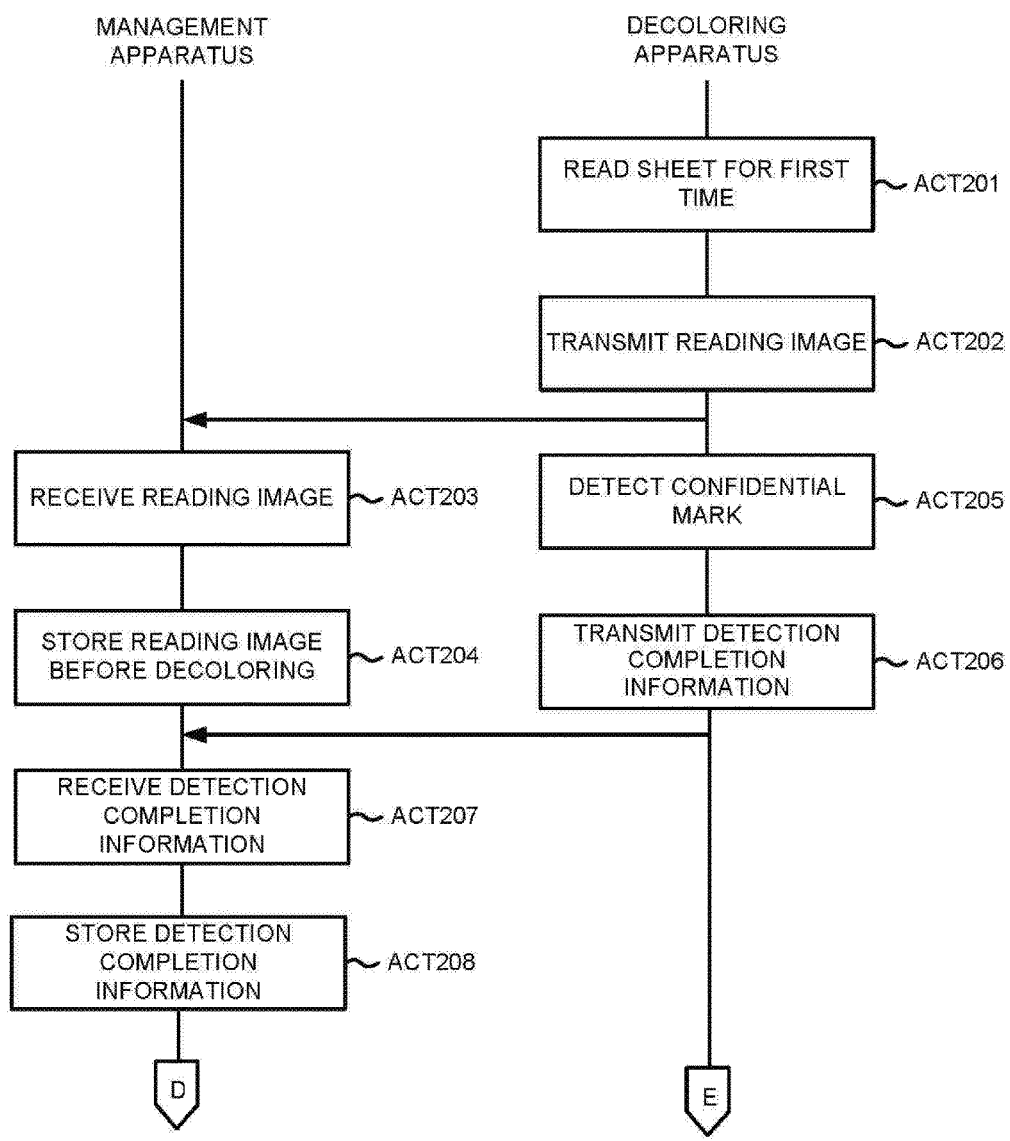
FIG. 16 is a sequence diagram illustrating the flow of a processing of managing the sheet on which the confidential image is formed by the management system according to the embodiment.
Figure 17:
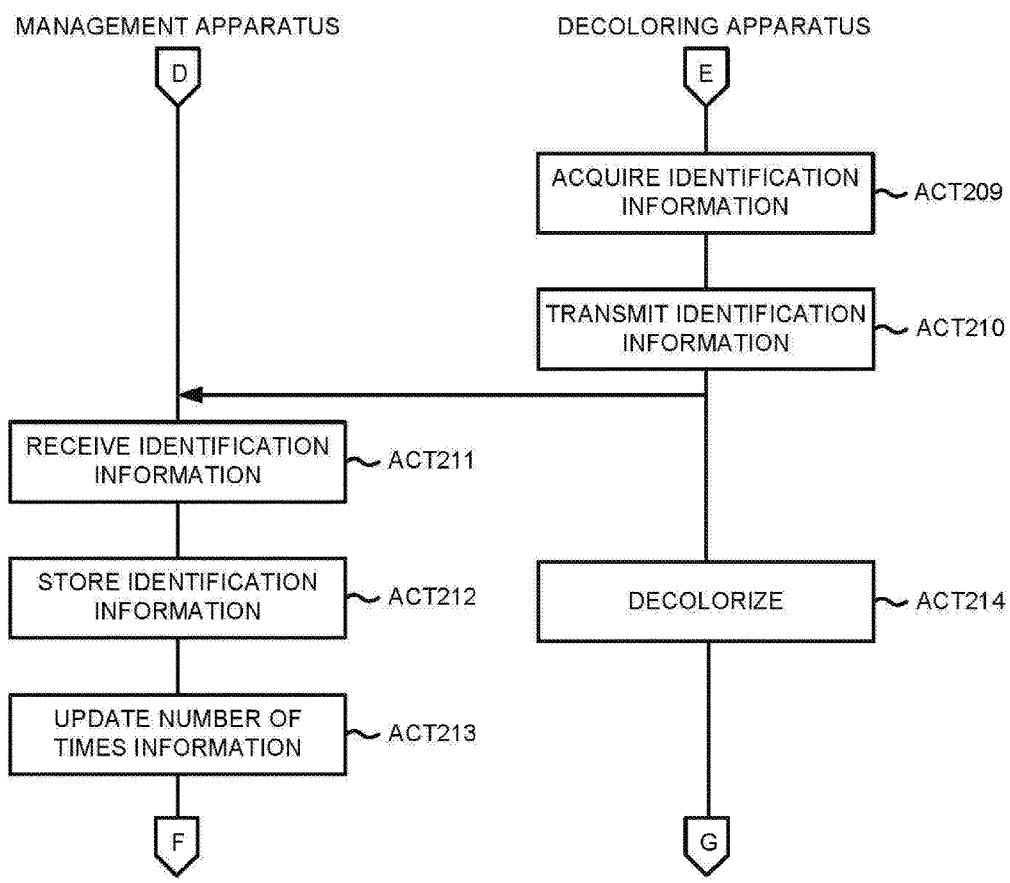
FIG. 17 is a sequence diagram illustrating the flow of the processing of managing the sheet on which the confidential image is formed by the management system according to the embodiment.
Figure 18:
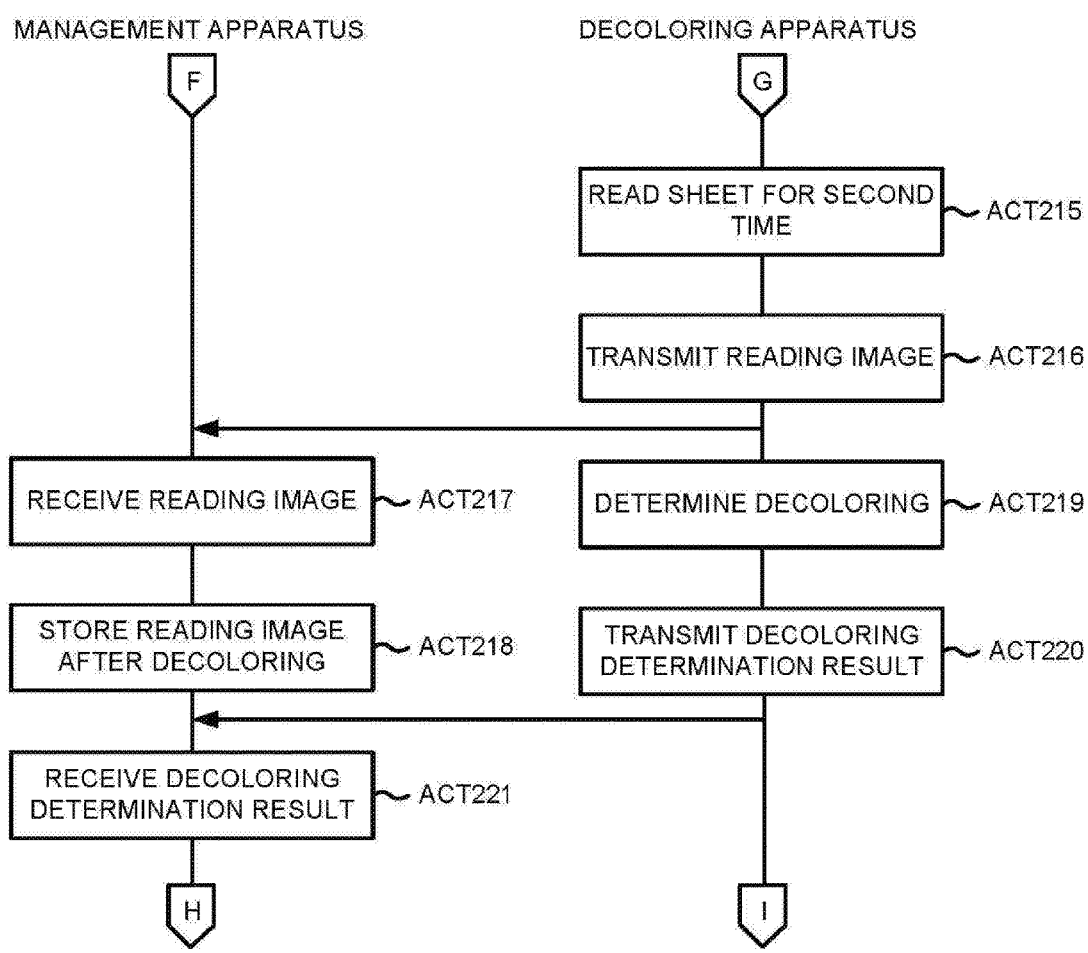
FIG. 18 is a sequence diagram illustrating the flow of the processing of managing the sheet on which the confidential image is formed on the sheet by the management system according to the embodiment.
Figure 19:
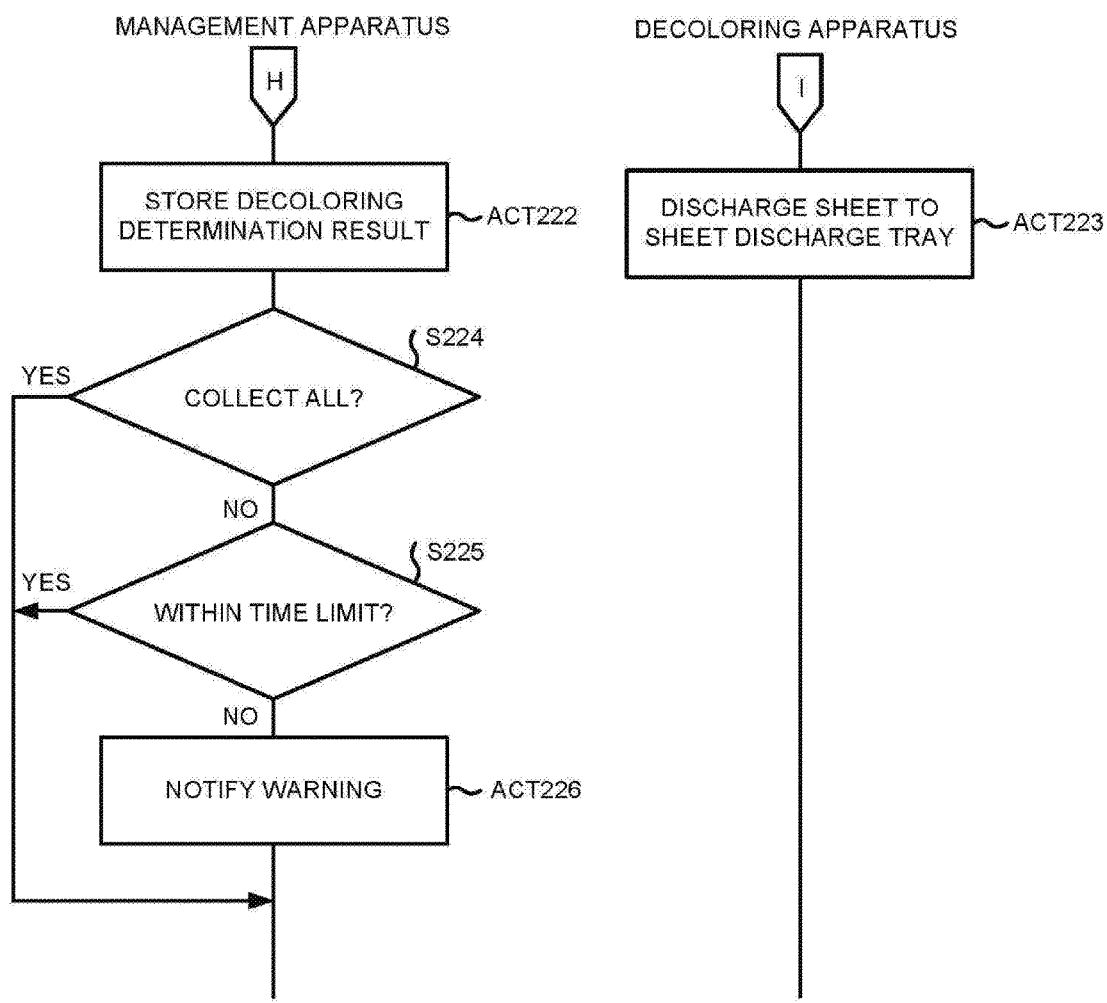
FIG. 19 is a sequence diagram illustrating the flow of the processing of managing the sheet on which the confidential image is formed by the management system according to the embodiment.

FIG. 14 and FIG. 15 are sequence diagrams illustrating the flow of a processing for forming an image indicated by the confidential information on the sheet by the management system 1 according to the embodiment.

The input information acquisition section 161 of the user terminal 10 acquires the start association information input to the input section 11 (ACT 101). The identification number request section 162 of the user terminal 10 acquiring the start association information requests the management apparatus 40 to transmit the identification number via the communication section 12 (ACT 102). The identification number request section 162 of the user terminal 10 also transmits the basic management information to the management apparatus 40 via the communication section 12 (ACT 103). The identification number request reception section 441 of the management apparatus 40 acquires the identification number generated by the identification number generation section 442 (ACT 104). The identification number request reception section 441 of the management apparatus 40 stores the basic management information in association with the acquired identification number as well as the number of times information in the auxiliary storage device 43 as the management information (ACT 105). In response to the request from the identification number request section 162, the identification number request reception section 441 of the management apparatus 40 transmits the identification number acquired in ACT 105 to the user terminal 10 via the communication section 41 (ACT 106). At this time, the identification number request reception section 441 of the management apparatus 40 also transmits the acquired identification number to the image forming apparatus 20.

The identification number request section 162 of the user terminal 10 receives the identification number transmitted by the management apparatus 40 via the communication section 12 (ACT 107). The identification number acquisition section 252 of the image forming apparatus 20 receives the identification number transmitted by the management apparatus 40 via the communication section 21 (ACT 108).

The encoding section 163 of the user terminal 10 encodes the acquired identification number and the basic management information by the predetermined method to generate the management mark (ACT 109). The formation image information generation section 164 of the user terminal 10 combines the confidential image information, the image information of the management mark and the confidential mark which is stored in advance in the auxiliary storage device 15 to generate the formation image Information (ACT 110). The transmission section 165 of the user terminal 10 transmits the identification number, the designated number of printed sheets information, and the generated formation image information to the image forming apparatus 20 (ACT 111). The "image forming information" in FIG. 15 indicates the identification number, the designated number of printed sheets information and the formation image information. Based on the received identification number, designated number of printed sheets information and formation image information, the printer 22 of the image forming apparatus 20 forms an image indicated by the formation image information on the sheet (ACT 112). The printer 22 of the image forming apparatus 20 forms the image indicated by the formation image information on the sheet with the decoloring toner.

FIG. 16, FIG. 17, FIG. 18 and FIG. 19 are sequence diagrams illustrating the flow of a processing for managing the sheet on which the confidential image is formed by the management system 1 according to the embodiment. FIG. 16, FIG. 17, FIG. 18 and FIG. 19 are sequence diagrams illustrating a case in which the sheet on which the confidential image the confidential image is formed is fed to the decoloring apparatus 30 according to the embodiment.

The decoloring apparatus 30 reads the sheet on which the confidential image is formed with the reading section 305 to generate the reading image information before decoloring by the reading controller 3083 (ACT 201). The transmission controller 3087 of the decoloring apparatus 30 sends the reading image information before decoloring acquired in ACT 201 to the management apparatus 40 via the communication section 307 (ACT 202). The detection result acquisition section 443 of the management apparatus 40 receives the reading image information before decoloring transmitted by the transmission controller 3087 of the decoloring apparatus 30 (ACT 203). The detection result acquisition section 443 of the management apparatus 40 stores the acquired reading image information before decoloring in the auxiliary storage device 43 (ACT 204). Following ACT 202, the reading controller 3083 of the decoloring apparatus 30 controls the reading section 305 to detect the confidential mark (ACT 205). Upon detecting the confidential mark, the transmission controller 3087 of the decoloring apparatus 30 transmits the confidential mark detection completion information to the management apparatus 40 (ACT 206). The detection result acquisition section 443 of the management apparatus 40 receives the confidential mark detection completion information transmitted by the decoloring apparatus 30 (ACT 207). The detection result acquisition section 443 of the management apparatus 40 stores the acquired detection completion information in the auxiliary storage device 43 (ACT 208). The decoding section 3085 of the decoloring apparatus 30 acquires the identification number by detecting and decoding the management mark (ACT 209). The transmission controller 3087 of the decoloring apparatus 30 transmits the acquired identification information to the management apparatus 40 (ACT 210). The detection result acquisition section 443 of the management apparatus 40 receives the identification information transmitted by the decoloring apparatus 30 (ACT 211). The detection result acquisition section 443 of the management apparatus 40 stores the identification information received in the ACT 211 in the auxiliary storage device 43 (ACT 212). The number of times count section 444 of the management apparatus 40 refers to the management information to update the value of the number of times information associated with the received identification information (ACT 213). Following ACT 210, the decoloring section 306 of the decoloring apparatus 30 executes the decoloring processing on the sheet (ACT 214). The decoloring apparatus 30 reads the sheet subjected to the decoloring processing in ACT 214 with the reading section 305 to generate the reading image information after decoloring with the reading controller 3083 (ACT 215). The transmission controller 3087 of the decoloring apparatus 30 sends the reading image information after decoloring generated in the ACT 215 to the management apparatus 40 (ACT 216). The detection result acquisition section 443 of the management apparatus 40 receives the reading image information after decoloring transmitted by the decoloring apparatus 30 (ACT 217). The detection result acquisition section 443 of the management apparatus 40 stores the received reading image information after decoloring in the auxiliary storage device 43 (ACT 218). Following ACT 216, the decoloring determination section 3086 of the decoloring apparatus 30 determines whether or not the decoloring is executed based on the reading image information after decoloring (ACT 219). The transmission controller 3087 of the decoloring apparatus 30 transmits the determination result information indicating the determination result to the management apparatus 40 (ACT 220). The detection result acquisition section 443 of the management apparatus 40 receives the determination result information transmitted by the decoloring apparatus 30 (ACT 221). The detection result acquisition section 443 of the management apparatus 40 stores the received determination result information in the auxiliary storage device 43 (ACT 222). Following ACT 220, the decoloring controller 3082 of the decoloring apparatus 30 discharges the sheet to a sheet discharge tray 3111 (ACT 223). The number of sheets determination section 445 of the management apparatus 40 determines whether or not the management system 1 collects all of the sheets managed by the identification information received in ACT 211. Specifically, the number of sheets determination section 445 of the management apparatus 40 compares the value of the number of times information with the value of the designated number of times information to determine whether they match or not (ACT 224). The value of the number of times information is a value updated by the number of times count section 444 of the management apparatus 40 in ACT 213. The designated number of times information is contained in the management information stored in the auxiliary storage device 43 by the identification number request reception section 441 in the ACT 105. If it is determined that they match (Yes in ACT 224), the management apparatus 40 determines that the management system 1 already collects all the sheets and enters a standby state. If it is determined that they do not match (No in ACT 224), the time limit determination section of the management apparatus 40 determines whether or not the current time exceeds the collection due date indicated by the collection time limit information contained in the management information (ACT 225). If it is determined that the current time exceeds the collection due date (No in ACT 225), the notification determination section 447 of the management apparatus 40 determines that it is in an unfinished state (ACT 226). The unfinished state is a state of the management system 1 in which all the sheets is not collected yet even after the collection due date. Furthermore, the notification determination section 447 of the management apparatus 40 sends information (hereinafter referred to as "unfinished information") indicating that it is in an unfinished state to the user terminal 10 via the notification section 448. An unfinished warning is contained in the time limit exceeding determination result information. If it is determined that the current time does not exceed the collection due date (Yes in ACT 225), the management apparatus 40 enters the standby state.

If the sheet is not fed to the decoloring apparatus 30, the management system 1 refers to the built-in clock (not shown) at predetermined intervals and executes the accomplishment determination. The management system 1 performs the accomplishment determination for all the identification numbers contained in the management information. If the management system 1 notifies the user terminal 10 of the unfinished information if it is determined that the current time exceeds the collection due date.

In the embodiment, the management system 1 is constituted by four mutually different housings (i.e., the user terminal 10, the image forming apparatus 20, the decoloring apparatus 30, and the management apparatus 40); however, they are not necessarily housings different from each other. The management system 1 may be constituted by a device having all the functions of the user terminal 10, the image forming apparatus 20, the decoloring apparatus 30 and the management apparatus 40 in one housing or in two or more housings. For example, the image forming apparatus may include a functional section of the management apparatus 40. In that case, the management system 1 is composed of the user terminal 10, the image forming apparatus, and the decoloring apparatus 30. The management system 1 may be composed of five or more housings.

A part or all of the functional sections of the user terminal 10, the image forming apparatus 20, the decoloring apparatus 30 and the management apparatus 40 are not necessarily provided in the apparatus of the embodiment, but may be provided in the other apparatuses. For example, a part or all of the functional sections of the user terminal 10 may be provided in the management apparatus 40 or the image forming apparatus 20. More specifically, for example, the identification number request section 162, the encoding section 163 and the formation image information generation section 164 may be provided not in the user terminal 10 but in the image forming apparatus 20.

The decoloring apparatus 30 may further include a plurality of sheet discharge trays and a sorting section. The sorting section sorts the sheets and discharges the sheets to the plurality of sheet discharge trays based on the determination result of the decoloring determination section 3086. For example, the sorting section may sort the sheets and discharge them depending on whether the determination result of the decoloring determination section 3086 is the determination result that the sheets are decolorized or not. In the management system 1 constituted in this way can only collect decolorized sheets. Therefore, the management system 1 constituted in this way has an effect of reducing the burden of sheet selection work by the user and enabling the user to reuse the sheet.

If the determination result of the decoloring determination section 3086 is a determination result that the image cannot be decolorized, the decoloring apparatus 30 may notify the user of the determination result.

In the embodiment, the identification number is given for each confidential image by setting the confidential image as a unit, but the identification number may be given for each confidential image with the predetermined plural kinds of images as one unit.

The confidential mark is not necessarily formed and the management mark may have the same function as the confidential mark.

A timing at which the management apparatus 40 notifies the user terminal is not limited to a case in which the sheets cannot be collected even after the collection due date. For example, the management apparatus 40 may notify the user terminal 10 at a predetermined timing before a predetermined collection due date. The management system 1 constituted in this way informs the user that the collection due date is close before the collection due date, so the effect of raising the possibility of finishing collection of all the sheets by the collection due date can be achieved.

The notification determination section 447 may notify the user terminal 10 even if all the sheets can be collected by the collection due date. The management system 1 constituted in this way enables the user to recognize that the collection of the sheets is completed. Therefore, it is possible to reduce the burden on the work of the user who confirms the number of sheets and determines whether or not there is a sheet forgotten to be collected.

The notification determination section 447 does not necessarily need to make notification. The notification determination section 447 may store the determination result in the auxiliary storage device 43 and display the determination result on the display section 13 according to an instruction input by the user to the user terminal 10.

The management apparatus 40 does not necessarily need to be notified by the display device of the user terminal 10, and may be notified by sound or odor. The management apparatus 40 constituted in this way has the effect of enabling blind people to recognize the notification as well.

The management apparatus 40 does not necessarily need to inform the user terminal 10, and for example, by being registered in advance in the management system 1 as a notification destination, a predetermined terminal other than the user terminal 10 may be notified.

In the management system 1, it is not always necessary to form an image using the toner which is decolorized by heating, and an image may be formed by using a toner which is decolorized with a predetermined light, for example.

In the management system 1, if the management system 1 is composed of a plurality of housings, the housings are not necessarily connected to each other by a LAN, and may be connected by a WAN (Wide Area Network).

In addition to the identification number and the basic management information, the encoding section 163 may acquire the designated number of sheets information to generate the management mark individually for each sheet.

All or a part of the functions of the image forming apparatus 20, the decoloring apparatus 30 and the management apparatus 40 may be realized by using hardware such as ASIC, PLD, FPGA, or the like. The program may be recorded on a computer-readable recording medium. The computer-readable recording medium is, for example, a portable medium such as a flexible disk, a magneto-optical disk, a ROM, a CD-ROM or the like, or a storage device such as a hard disk built in a computer system. The program may be transmitted via an electric communication line.

The identification number is an example of first information. The identification number generation section 442 is an example of a first information generation section.

The confidential mark or the management mark is an example of second information. The mark detection section 3084 and the decoding section 3085 are an example of a second information generation section. The number of sheets determination section 445, the time limit determination section 446 and the notification determination section 447 are an example of a determination section. The auxiliary storage device 43 is an example of a storage section.

According to at least one embodiment described above, by including the mark detection section 3084 configured to detect the confidential mark indicating that the sheet on which the confidential image is formed is fed to the decoloring apparatus 30, the decoding section 3085 configured to detect the management mark, the identification number generation section 442 configured to generate the identification number, the number of sheets determination section 445 configured to determine whether or not all the sheets on which the confidential images are formed are collected, the time limit determination section 446 configured to determine whether or not the current time is the predetermined time limit, the notification determination section 447 configured to determine whether or not the decoloring processing is executed on all the sheets the number of which is indicated by the designated number of sheets information by the predetermined time limit based on the determination result of the number of sheets determination section and the determination result of the time limit determination section, and the notification section 448 configured to notify the user of the determination result of the notification determination section 447, it is possible to enhance the possibility of collecting all the sheets on which the confidential images are formed.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A management system, comprising:
   a processor that executes instructions to perform operations comprising:
   generating first information indicating that forming an image on a sheet is executed;
   generating second information indicating that decolorizing the image formed on the sheet is executed;
   storing the first information and the second information;
   determining whether or not the decolorizing the image formed on the sheet is executed on the sheet by a predetermined time point based on the first information and the second information; and
   determining whether or not the decolorizing the image formed on the sheet is executed on all the sheets until either one or both of the predetermined time point and a time point before the predetermined time point after the first information is acquired.

2. The management system according to claim 1, wherein the operations further comprise:
   notifying a predetermined user of a result of the determining.

3. The management system according to claim 1, wherein the operations further comprise:
   determining that the decolorizing the image formed on the sheet is not executed until the predetermined time point if the second information is not acquired at the time information instructing the decolorizing the image is input by the predetermined time point after the first information is acquired at the time information instructing formation of the image is input.

4. The management system according to claim 1, the operations further comprise:
   reading the sheet on which the image is formed.

5. The management system according to claim 4, the operations further comprise:
   the second information is generated based on a reading result of the sheet on which the image is formed by the reading section before the decoloring the image formed on the sheet is executed.

6. The management system according to claim 4, the operations further comprise:
   determining whether or not the image is decolorized by the decoloring based on a reading result of the sheet subjected to the decoloring.

7. The management system according to claim 1, further comprising:
an image forming apparatus, a user terminal, and a decoloring apparatus connected to each other via a large area network.

8. A management apparatus, comprising:
a processor; and
a memory that stores instructions, that in response to execution by the processor, perform operations, comprising:
generating first information indicating that forming an image on a sheet is executed;
generating second information indicating that decolorizing the image formed on the sheet is executed;
storing the first information and the second information;
determining whether or not the decolorizing the image formed on the sheet is executed on the sheet by a predetermined time point based on the first information and the second information; and
determining whether or not the decolorizing the image formed on the sheet is executed on all the sheets until either one or both of the predetermined time point and a time point before the predetermined time point after the first information is acquired.

9. The management apparatus according to claim 8, wherein the operations further comprise:
determining that the decolorizing the image formed on the sheet is not executed until the predetermined time point if the second information is not acquired at the time information instructing the decolorizing the image is input by the predetermined time point after the first information is acquired at the time information instructing formation of the image is input.

10. The management apparatus according to claim 8, wherein the operations further comprise:
generating, based on a reading result, of the sheet on which the image is formed before the decoloring the image formed on the sheet is executed.

11. A management method, comprising:
generating, by a device comprising a processor, first information indicating that forming an image on a sheet is executed;
generating, by the device, second information indicating that decolorizing the image formed on the sheet is executed;
storing the first information and the second information;
determining, by the device, whether or not the decolorizing the image formed on the sheet is executed by a predetermined time point based on the first information and the second information; and
determining, by the device, whether or not the decolorizing the image formed on the sheet is executed on all the sheets until either one or both of the predetermined time point and a time point before the predetermined time point after the first information is acquired.

12. The management method according to claim 11, further comprising:
notifying, by the device, a predetermined user of a determination result.

13. The management method according to claim 11, further comprising:
determining, by the device, that the decolorizing the image formed on the sheet is not executed until the predetermined time point if the second information generated is not acquired at the time information instructing the decolorizing the image is input by the predetermined time point after the first information generated is acquired at the time information instructing formation of the image is input.

14. The management method according to claim 11, further comprising:
reading, by the device, the sheet on which the image is formed.

15. The management method according to claim 14, further comprising:
generating, by the device, the second information based on a reading result of the sheet on which the image is formed before the decoloring the image formed on the sheet is executed.

16. The management method according to claim 14, further comprising:
determining, by the device, whether or not the image is decolorized by the decoloring based on a reading result of the sheet subjected to the decoloring.

* * * * *